United States Patent [19]
Nakajima

[11] Patent Number: 5,816,922
[45] Date of Patent: Oct. 6, 1998

[54] GAME APPARATUS AND METHOD FOR DEBUGGING GAME PROGRAM

[75] Inventor: Tomohiko Nakajima, Hokkaido, Japan

[73] Assignee: Hudson Soft Co., Ltd., Hokkaido, Japan

[21] Appl. No.: 770,569

[22] Filed: Dec. 19, 1996

[30] Foreign Application Priority Data

Dec. 25, 1995 [JP] Japan .................................. 7-350906

[51] Int. Cl.⁶ .................................................. G06F 11/00
[52] U.S. Cl. ............................................................ 463/44
[58] Field of Search .................................. 463/1, 43, 44, 463/46, 47, 29, 24; 385/704, 705

[56] References Cited

U.S. PATENT DOCUMENTS

5,586,323 12/1996 Koizumi et al. ........................ 395/705
5,599,231 2/1997 Hibino et al. ............................. 463/46
5,680,534 10/1997 Yamato et al. ............................. 463/1

*Primary Examiner*—George Manuel
*Attorney, Agent, or Firm*—McDermott, Will & Emery

[57] ABSTRACT

In a game apparatus and a method of debugging a game program, a based time is determined, then a start time of a debugging process in a game is set. Next, the based time is compared with the start time. If the based time is bigger than the start time, the start time of the debugging process in the game must be set again. In the game apparatus and the method of the present invention, therefore, the time in the game program is not inconsistency with a contents of a game history. The game program can be debugged correctly. Further, in developing a game program, a game program debug dose not waste working-time and working-load of a developer.

6 Claims, 7 Drawing Sheets

GAME APPARATUS AND METHOD FOR DEBUGGING GAME PROGRAM

FIELD OF THE INVENTION

The invention relates to a game apparatus and a method for debugging a game program, and more particularly, to a game apparatus and a method for debugging a program of a virtual reality type game which are played by using time and clock functions.

BACKGROUND OF THE INVENTION

A conventional game apparatus comprises a game unit and a ROM cartridge. The game unit has a CPU (Central Processing Unit), a RAM (Random Access Memory), a ROM (Read-Only Memory), I/O (Input/Output) interfaces, and a timer. The ROM cartridge has an I/O interface and a ROM for storing a game program. The game unit and the ROM cartridge are connected with each other through the each I/O interface.

In developing a game program, a game program debug wastes working-time and working-load. Game program errors includes three types errors which are a compile error, a link error and an executing error. The compile error and link error are easy to be debugged, because each error point of the two types errors is detected by a compiler or a linker in a computer system.

On the other hand, the executing error is hard to be debugged, because the computer system dose not detect an error point of the executing error.

Therefore, when the executing error is occurred, a manner called as "check-print" is generally used by a debugger. In the check-print, the debugger selects an error factor and an error point in a game program, then "check-print" commands are inserted into any points of the game program in related with the error factor and point. Next, the results of the check-print commands are outputted, then the debugger examines the results. In this manner, the executing error of the game program is debugged.

In the conventional method for debugging a game program, however, there are disadvantages in that an error situation of a program of a virtual reality type game using a virtual real time is hard to be reproduced, because, in the virtual reality type game, an event of the game is often inconsistent with a time of the game.

SUMMARY OF THE INVENTION

Accordingly, it is an object of the invention to provide a game apparatus and a method for debugging a game program such as a virtual reality type game.

According to the first feature of the invention, a method for debugging a game program in a game apparatus comprises the steps of setting a reference time to debug the game program, setting a start time to debug the game program, comparing the reference time with the start time to determine whether the start time is later than the reference time, and controlling a debugging processs to be carried out when the start time is later than the reference time, and to be stopped when the start time is not later than the reference time, thereby repeating the start time setting step to set the start time being later than the reference time.

According to the second feature of the invention, a game apparatus for debugging a game program comprises means for setting a reference time to debug the game program, means for setting a start time to debug the game program, means for comparing the reference time with the start time to determine whether the start time is later than the reference time, and means for controlling a debugging processs to be carried out when the start time is later than the reference time, and to be stopped when the stert time is not later than the reference time, thereby repeating the start time setting step to set the start time being later than the reference time.

According to the third feature of the invention, a game apparatus for debugging a game program comprises, a ROM cartridge for storing a game program and a debug program, and a game unit for processing the game program and the debug program, the debug program in the ROM cartridge, further comprises means for setting a reference time to debug the game program, means for setting a start time to debug the game program, means for comparing the reference time with the start time to determine whether the start time is later than the reference time, and means for controlling a debugging processs to be carried out when the start time is later than the reference time, and to be stopped when the start time is not later than the reference time, thereby repeating the start time setting step to set the start time being later than the reference time.

BRIEF DESCRIPTION OF THE DRAWINGS

The invention will be described in more detail in conjunction with the accompanying drawings, wherein.

PIG. 2 is a flow chart of a debug process of the time process in FIG. 1.

PIG. 7 is a block schematic diagram of a calculating process in FIGS. 6A and 6B.

DETAILED DESCRIPTION OF THE PREFERRED EMBODIMENTS

Before explaining a game apparatus and a method for debugging a game program in the preferred embodiment according to the invention, the above mentioned conventional game apparatus and method for debugging a game program will be explained in FIGS. 1 and 2.

A conventional game apparatus comprises a game unit and a ROM cartridge. The game unit has a CPU (Central Processing Unit), a RAM (Random Access Memory), a ROM (Read-Only Memory), I/O (Input/Output) interfaces, and a timer. The ROM cartridge has an I/O interface and a ROM for storing a game program. The game unit and the ROM cartridge are connected with each other through the each I/O interface.

In developing a game program, a game program debug wastes working-time and working-load. Game program errors includes three types errors which are a compile error, a link error and an executing error. The compile error and link error are easy to be debugged, because each error point of the two types errors is detected by a compiler or a linker in a computer system.

On the other hand, the executing error is hard to be debugged, because the computer system dose not detect an error point of the executing error. In particular, when the game program is ended without hanging up the game program at the midge and the result of the game program is incorrect, the executing error is very hard to be debugged.

Therefore, when the executing error is occurred, a manner called as "check-print" is generally used by a debugger. The check-point is to output contents of a point indicated by the debugger in the game program. In the check-print, the debugger selects an error factor and an error point in a game program, then "check-print" commands are optionally inserted into any points of the game program in related with the error factor and point. Next, the results of the check-print commands are outputted, then the debugger examines the results. In this manner, the executing error of the game program is debugged.

On the other hand, a game apparatus with a RTC (Real Time Clock) for playing a virtual reality type game is developed. The RTC is an IC (Integrated Circuit) having a clock function and a calendar function. A virtual real time of a game is corresponded with a real time by the clock function and the calendar function in the RTC. Namely, the RTC saves year, month, day, day of the week, hour, minute, and second of the real time therein as the virtual real time of the game by using the clock function and the calendar function.

Figure 1:
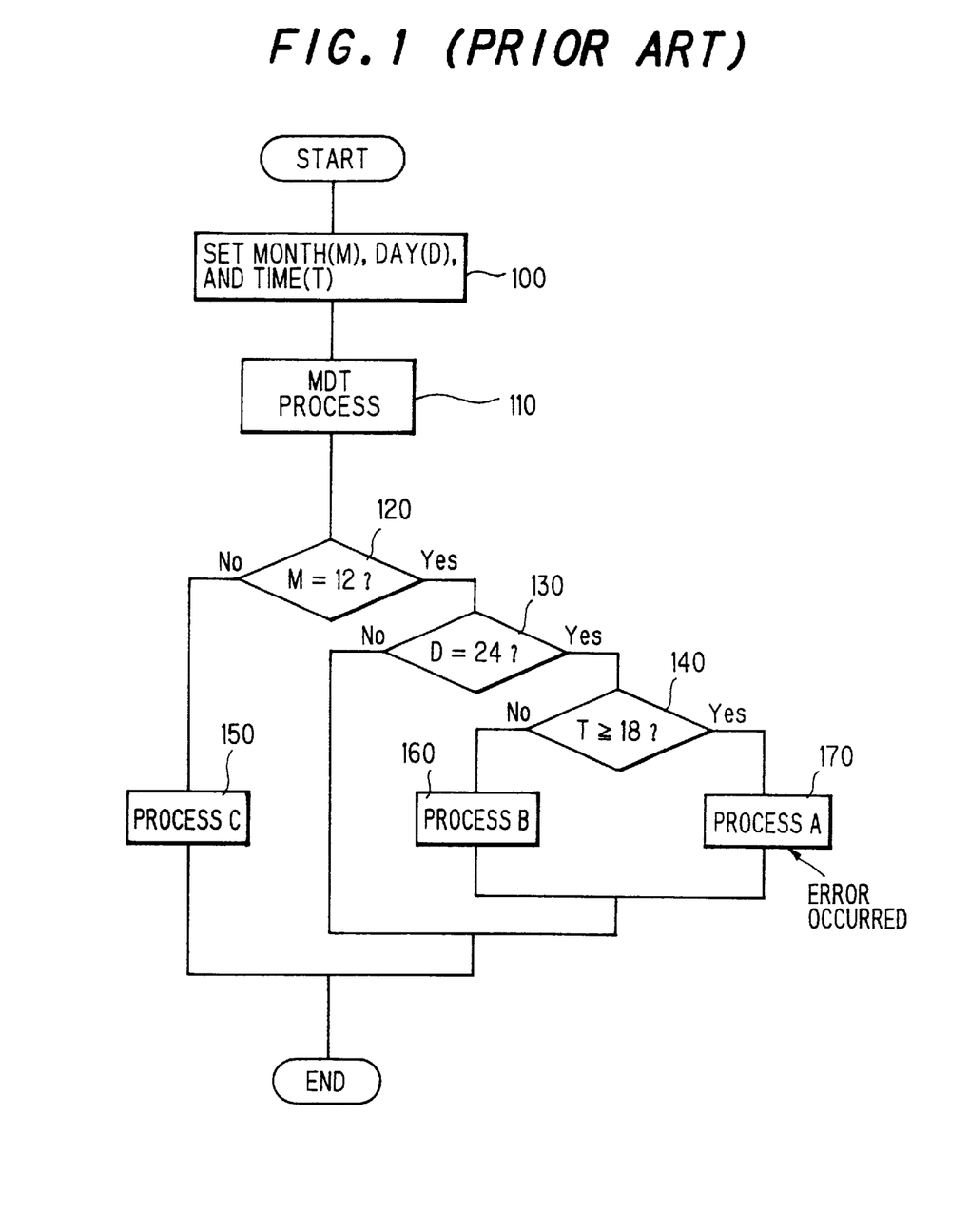
FIG. 1 is a flow chart of a time process of a virtual reality type game.
Figure 2:
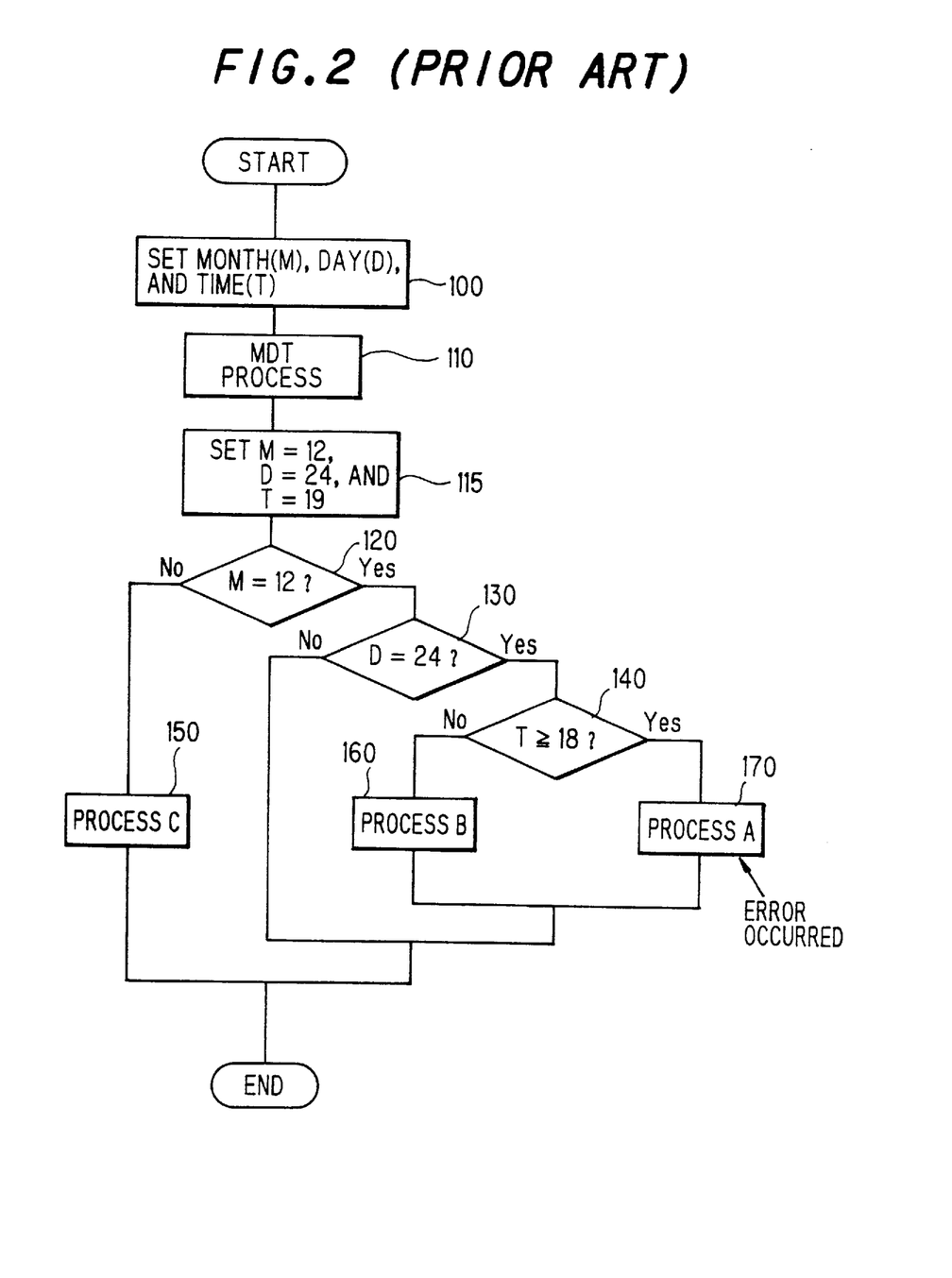

FIG. 1 is a flow chart of a time process of a virtual reality type game. In FIG. 1, the game program processes a virtual real time including month, day, and clock time. In the time process, the virtual real time including month (M), day (D), and clock time (T) is set into the game program from a RTC at the step 100. At the step 110, the M, D, and T of the game program is processed (MDT process). At the step 120, if the M is equal to "12", then the step 130 follows, else the step 150 follows and a process C is executed. At the step 130, if the D is equal to "24", then the step 140 follows, else the time process ended. At the step 140, if the T is less than "18", then the step 160 follows and a process B is executed, else the step 170 follows and a process A is executed.

In this case, a conventional method for debugging a game program is explained on assumption that an error has occurred in the process A. FIG. 2 is a flow chart of a debug process of the time process in FIG. 1. In FIG. 2, the step 115 is inserted into between the step 110 and the step 120 to reproduce the error at the process A. At the step 115, the M, D, and T are set to be "12", "24", "19", respectively. Therefore, the step 170 follows through the step 120, 130, and 140. Then the error is reproduced in the process A at the step 170. The debugger can debug the game program based on the reproduced error.

In the conventional method for debugging the game program, however, there are disadvantages in that the error situation of the program of the virtual reality type game using the virtual real time is hard to be reproduced, because, in the virtual reality type game, an event of the game is often inconsistent with a time of the game. Specially, when an event of the game is affected by other factors such as year and day of the week, the error situation in the game often is very hard to be reproduced.

For example, in the virtual reality type game, a scenario of the game is changed by even day of the week and the game history is stored. When an error was occurred on Sunday in the game and the game program is debugged on Monday, the day of the week of the game program must be set on Sunday of a preceding day, However, the day of the week (Sunday) of the game program is inconsistency with a contents of the game history. Therefore, the game program is very hard to be debugged correctly.

Further, at sharing one debug PC (Personal Computer), if the timer in the PC is changed by one developer, tests of other developers are affected.

Therefore, a method for debugging a game program such as a virtual reality type game, which dose not occur an inconsistent in a debug process, is necessary to be provided.

Next, a method for debugging a game program such as a virtual reality type game in the first preferred embodiment according to the invention will be explained in FIGS. 3 to 8.

Figure 3:
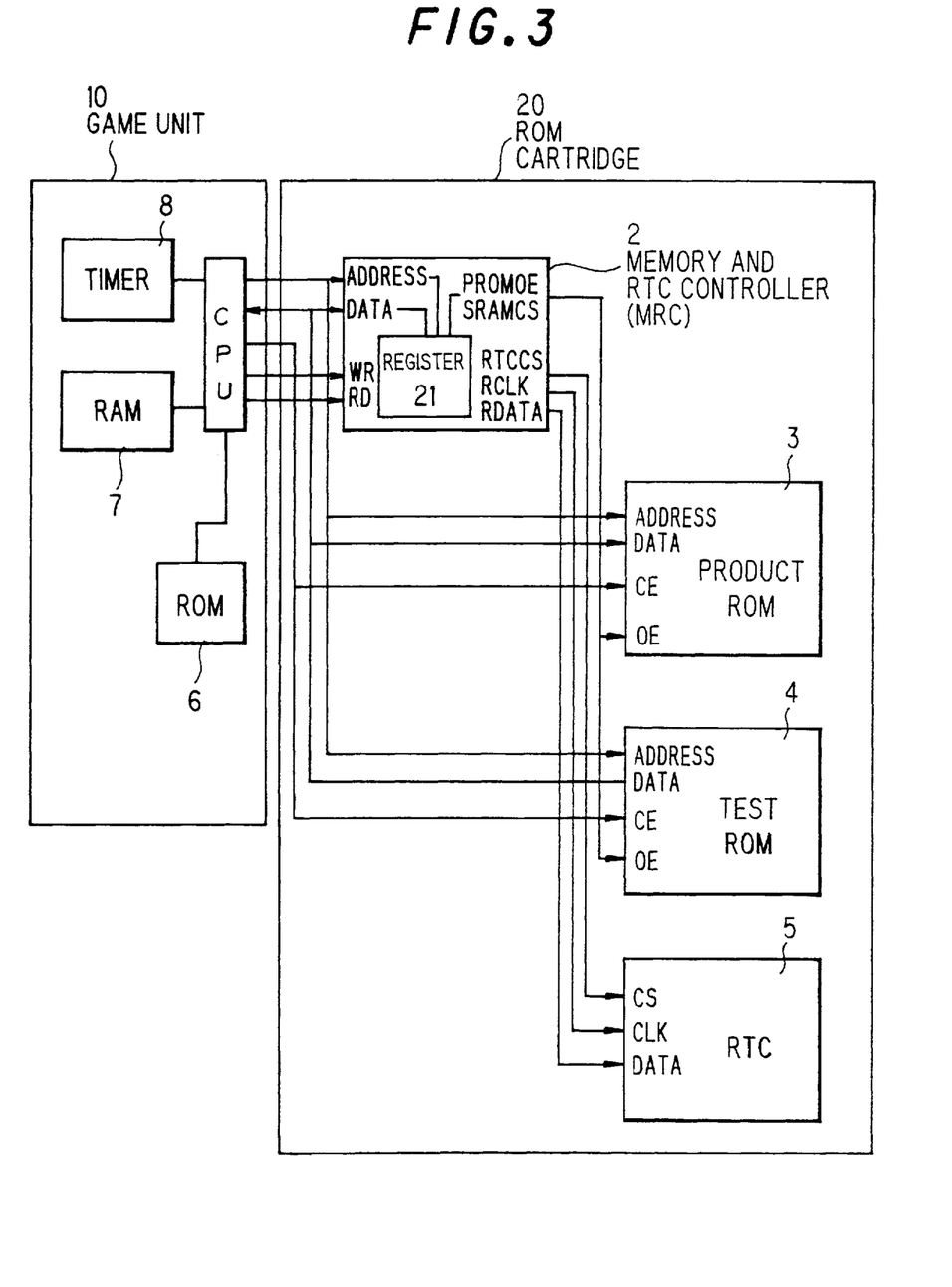
FIG. 3 is a block diagram of a debug system of the present invention.

FIG. 3 is a block diagram of a debug system of the present invention. In FIG. 3, the debug system comprises a game unit 10 and a ROM cartridge 20. The game unit 10 has a CPU 1, a ROM (Read Only Memory) 6, a RAM (Random Access Memory) 7, and timer 8. The ROM cartridge 20 has a MRC (Memory and RTC controller) 2, a product ROM 3, a test ROM 4, and a RTC (Real Time Clock) 5.

The CPU 1, the ROM 6, and the RAM 7 are connected with each other in the game unit 10. The CPU 1 is for performing programs and instructions. The ROM 6 is for storing programs and instructions of an operating system of the debug system. The RAM 7 is used as a main memory by the CPU 1.

In the ROM cartridge 20, the product ROM 3 is for storing a virtual reality type game program. The test ROM 4 is for storing a time adjusting program. The RTC 5 is an IC (Integrated Circuit) having a clock function and a calendar function. A time of the game is corresponded with a real time by the clock function and the calendar function in the RTC 5. Namely, the RTC 5 saves year, month, day, day of the week, hour, minute, and second of the real time therein at the time of the game by using the clock function and the calendar function. Further the RTC 5 includes a battery. The RTC 5 is supplied with a power by the battery. Therefore, if the ROM cartridge 20 is detached from the game unit 10, the RTC 5 correctly saves the time of the game therein independent of the game unit 10. The MRC 2 is for controlling memory addresses of the game program in the product ROM 3 and the time adjusting program in the test ROM 4. Further, the MRC 2 includes a register 21. The register 21 is for controlling a memory address of the time adjusting program in the test ROM 4.

The game unit 10 is connected with the ROM cartridge 20 through I/O interfaces (is not shown). The CPU 1 accesses the product ROM 3, the test ROM 4, and the RTC 5 through the MRC 2. When the CPU 1 loads the game program from the product ROM 3 and contents in the RTC 5, the game program and the contents are placed on the fixed address area in the RAM 7 by the MRC 2. Then, the CPU 1 processes the game program according to the contents from the RTC 5.

On the other hand, when the game program is debugged, the time adjusting program is loaded form the test ROM 4 and placed on another address area in the RAM 7 by the register 21 in the MRC 2. Namely, in the RAM 7, the memory area of the game program for a product game is divided from the memory area of the time adjusting program for a debug process. Therefore, when the test ROM 4 is detached from a ROM cartridge 20, the memory area of the time adjusting program for the debug process is not accessed by the game program. Namely, a debug routine can be accessed by using only the register 21 and the product game program can not access the debug routine. Further, when an error is occurred in the product ROM cartridge, a debug environment is easy to be reconstructed by inserting the test ROM 4 into the product ROM cartridge and adjusting the register 21 in the MRC 2.

Figure 4:
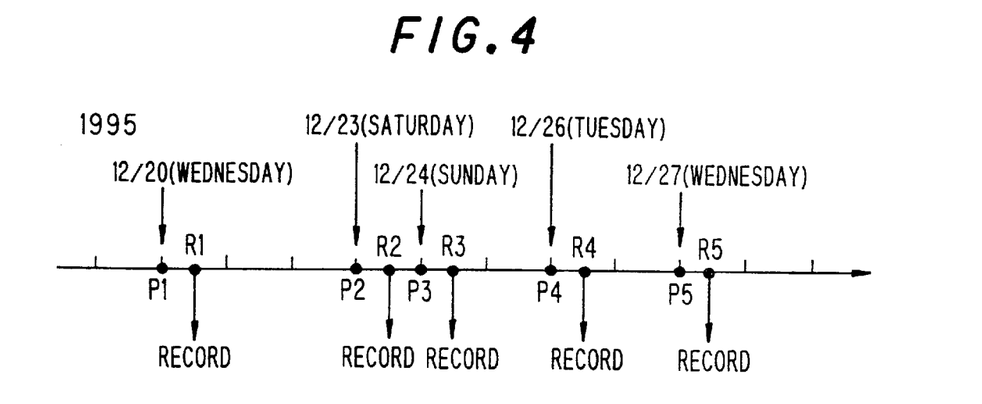
FIG. 4 is a timing chart of processing a test of a game program with a time influence.
Figure 5:
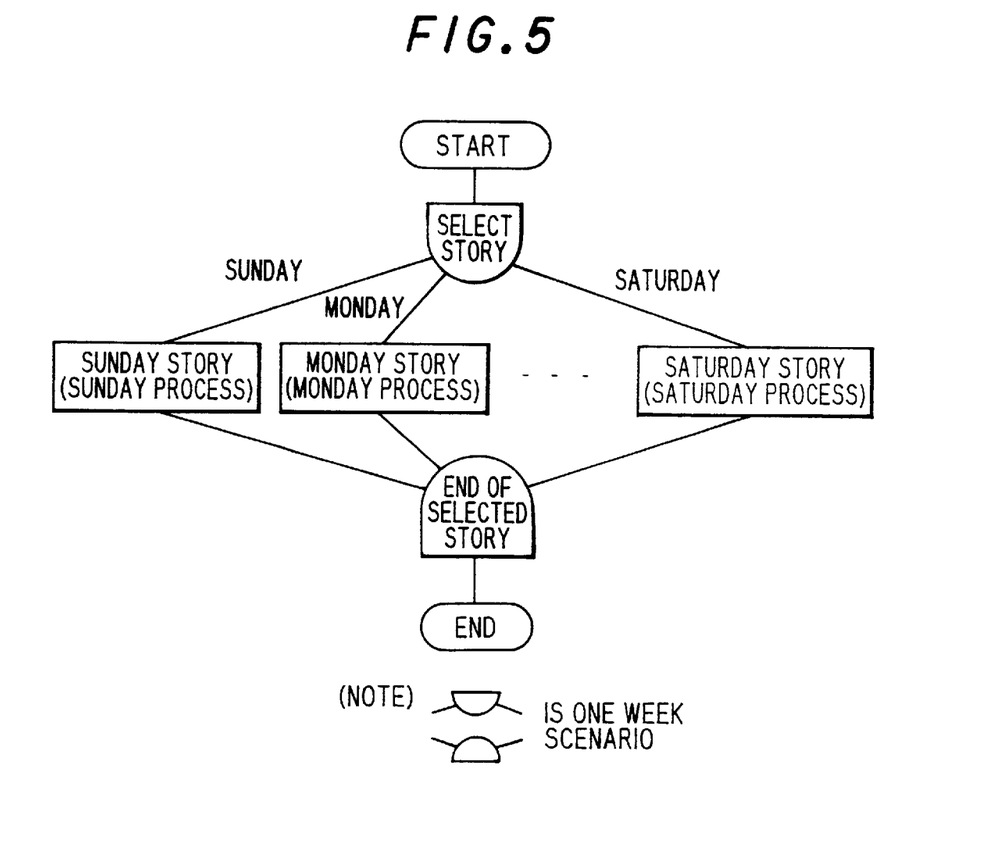
FIG. 5 is a flow chart of a scenario process of one week in the game program.

FIG. 4 is a timing chart of processing a test of a game program with a time influence. FIG. 5 is a flow chart of a scenario process of one week in the game program. Each story of the game is corresponding with day of the week. Namely, the game has seven game stories corresponding with each day of the week. The test of the game program with the time influence is processed at the points P1 to P5 and the results of the test is recorded at the points R1 to R5, respectively. The scenario at the point P1 (Dec. 20, 1995) is same as the scenario at the point P5 (Dec. 27, 1995), because the day of the week of the point P1 is same as that of the point P5 (i.e. Wednesday). However, the recorded result at the point R1 is not same as the recorded result at the point R5, because the event of the game story at the point P1 is different from an event of the game story at the point P5 by the time influence of the game program even if the both days of the week of the points P1 and P5 are same. In this case, the game program with the time influence is a game program having a game history. Thus, even if the debug is processed by going back to the data of the point P1, the debug process is failed, because the date of the point P1 is not matched for the date in the game history. Namely, the date in the game history is same as that of the point P5.

Therefore, a method for debugging a game program of the present invention is developed in which the day of the week and the date are calculated automatically, then the calculated date can not go back to the past.

Figure 6A:
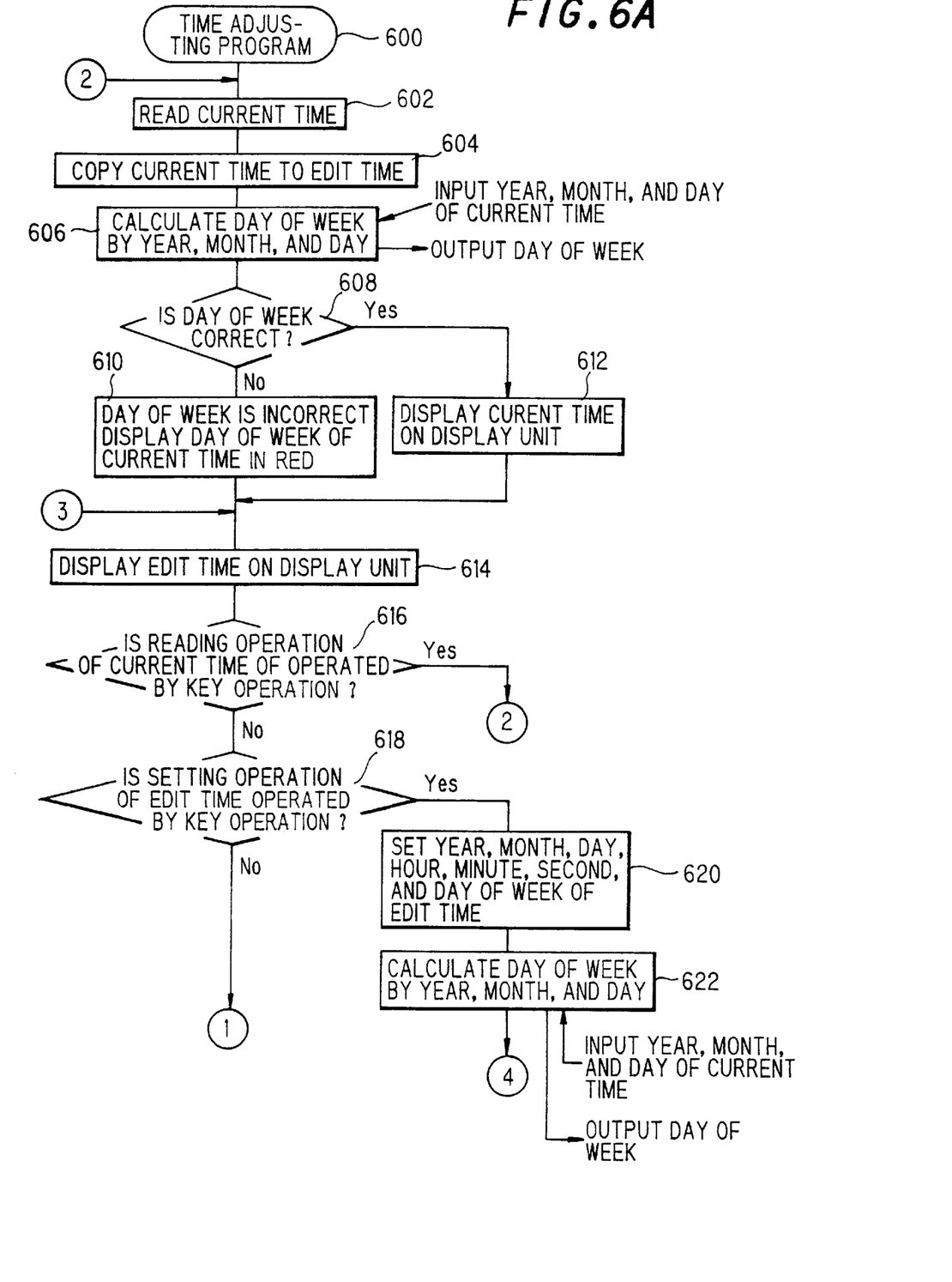
FIG. 6A is a flow chart of processing a time adjusting program of the present invention.
Figure 6B:
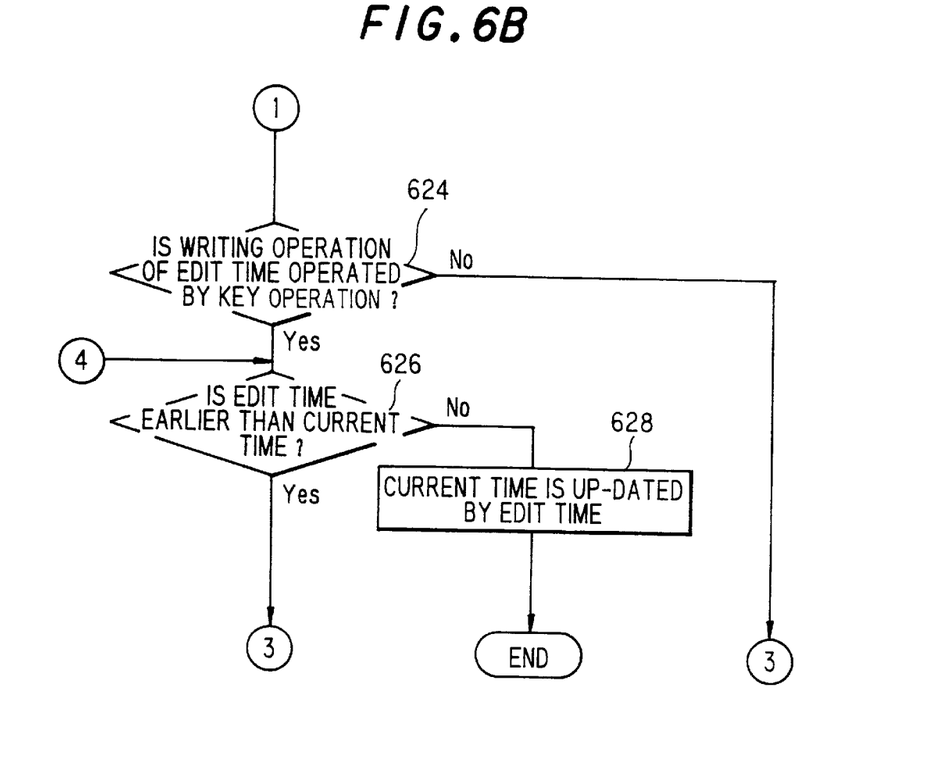
FIG. 6B is a flow chart of processing a time adjusting program of the present invention.

FIGS. 6A and 6B are flow charts of processing a time adjusting program of the present invention. At the step 600, a time adjusting program is started. At the step 602, a current time is read from the RTC 5, The current time is a virtual real time but not a real time. At the step 604, the current time is copied to an edit time. At the step 606, day of the week of the current time is calculated based on year, month, and day of the current time and the real time in the CPU. Namely, input data are year, month, and day of the current time, then an output data is day of the week of the current time. At the step 608, the calculated day of the week of the current time is compared with the day of the week of the real time. If the calculated day of the week of the current time is correct, the current time is displayed on a display unit at the step 612. If the calculated day of the week of the current time is in correct, when the current time is displayed on a display unit, the calculated day of the week of the current time is displayed in red at the step 610. At the step 614, the edit time is displayed on the display unit. At the step 616, when a read operation of the current time is operated by a key operation, the step 602 is returned. If not, the step 618 follows. At the step 618, when a set operation of the edit time is operated by the key operation, the step 620 follows. At the step 620, year, month, day, hour, minute, second, and day of the week of the edit time is set on. At the step 622, day of the week of the current time is calculated based on year, month, and day of the current time and the real time in the CPU. Namely, input data are year, month, and day of the current time, and an output data is day of the week of the current time. Then, the step 626 in FIG. 6B follows. At the step 626, when the edit time is more past than the current time, the step 614 is returned, because the edit time is inconsistent with the contents of the game history. At the step 626, when the edit time is earlier than the current time, the step 614 is returned, because the edit time is inconsistent with the contents of the game history. At the step 626, when the edit time is later than the current time, the step 628 follows. At the step 628, the current time is updated by the edit time. Then, the time adjusting process is ended.

At the step 618 in FIG. 6A, when a set operation of the edit time is not operated by the key operation, the step 624 in FIG. 6B follows. At the step 624, when a write operation of the edit time is operated by the key operation, the step 614 in FIG. 6A is returned. When a write operation of the edit time is not operated by the key operation, the step 626 follows. At the step 626, when the edit time is earlier than the current time, the step 614 is returned, because the edit time is inconsistent with the contents of the game history. At the step 626, when the edit time is later than the current time, the step 628 follows. At the step 628, the current time is updated by the edit time. Then, the time adjusting process is ended.

Figure 7:
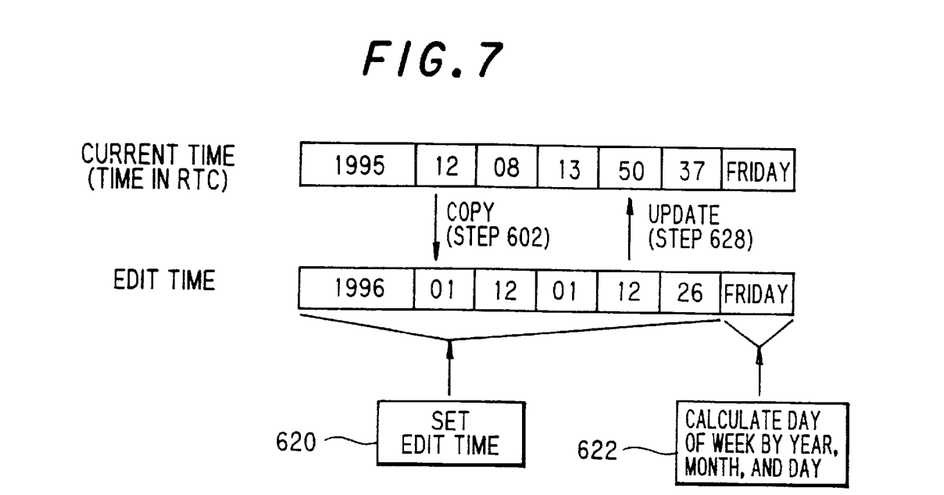

FIG. 7 is a block schematic diagram of a calculating process in FIGS. 6A and 6B. Year, month, day, hour, minute, second, and day of the week of the current time are 1995, 12, 08, 13, 50, 37, and Friday, respectively. The current time is copied to the edit time at the step 602 in FIG. 6A. Then, year, month, day, hour, minute, second, and day of the week of the edit time is set on at the step 620 in FIG. 6A. At the step 622 in FIG. 6A, day of the week of the current time is calculated based on year, month, and day of the current time and the real time in the CPU 1. Then, at the step 628 in FIG. 6B, the current time is updated by the edit time.

Figure 8:
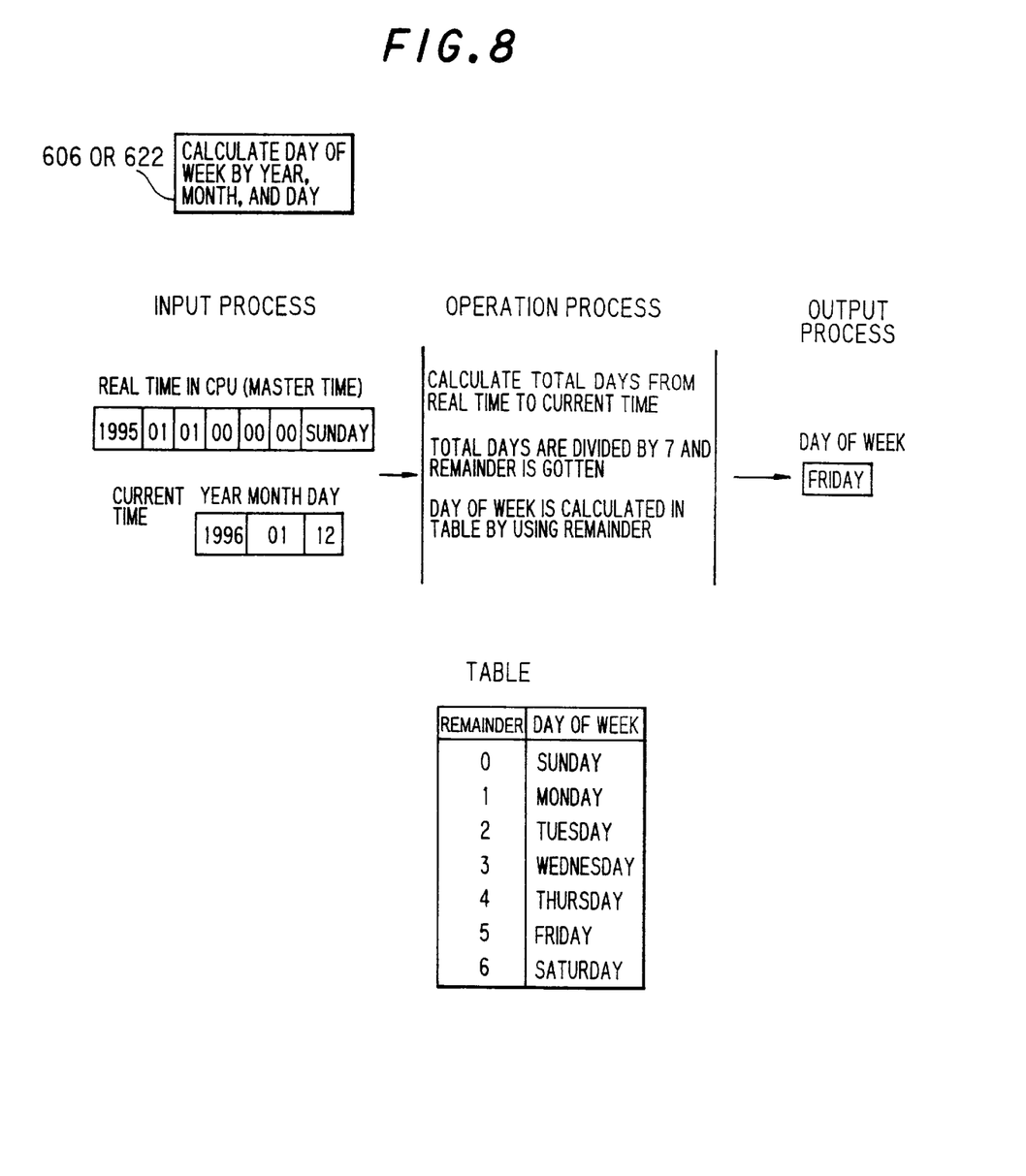
FIG. 8 is a block schematic diagram of a calculating process of the step 606 in FIG. 6A.

FIG. 8 is a block schematic diagram of a calculating process of the step 606 in FIG. 6A. In FIG. 8, in the input process, input data are a real time in the CPU 1 and a current time. Year (Y), month (M), day (D), hour (h), minute (m), second (s), and day of the week (DW) of the real time in the CPU 1 is 1995,01,01,00, 00,00,Sunday. Year, month, and day of the current time is Jan. 12, 1996. In the operation process, the total days are calculated as different days between the real time and the current time. The calculated total days are divided by 7 and the remainder is gotten by the dividing process. Then, day of the week of the current time is resulted by a day of the week table corresponding with the remainder. In output process, the day of the week of the current time is outputted as Friday.

According to the time adjusting process in FIGS. 6A and 6B, the time of the game program is not inconsistency with a contents of the game history.

Therefore, the game program can be debugged correctly. Further, in developing a game program, a game program debug dose not waste working-time and working-load of a developer.

As this invention may be embodied in several forms without departing from the sprit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. A method for debugging a game program in a game apparatus comprising the steps of:

setting a reference time to debug said game program;

setting a start time to debug said game program;

comparing said reference time with said start time to determine whether said start time is later than said reference time; and controlling a debugging processs to be carried out when said start time is later than said reference time, and to be stopped when said start time is not later than said reference time, thereby repeating said start time setting step to set said start time being later than said reference time.

2. The method, according to claim 1, further comprising the step of:

calculating day of the week of said start time based on said reference time.

3. A game apparatus for debugging a game program comprising:

means for setting a reference time to debug said game program;

means for setting a start time to debug said game program;

means for comparing said reference time with said start time to determine whether said start time is later than said reference time; and means for controlling a debugging processs to be carried out when said start time is later than said reference time, and to be stopped when said start time is not later than said reference time, thereby repeating said start time setting step to set said start time being later than said reference time.

4. The system, according to claim 3, further comprising:

means for calculating day of the week of said start time based on said reference time.

5. A game apparatus for debugging a game program comprising:

a ROM cartridge for storing a game program and a debug program; and a game unit for processing said game program and said debug program;

said debug program in said ROM cartridge, further comprising:

means for setting a reference time to debug said game program;

means for setting a start time to debug said game program;

means for comparing said reference time with said start time to determine whether said start time is later than said reference time; and means for controlling a debugging processs to be carried out when said start time is later than said reference time, and to be stopped when said stert time is not later than said reference time, thereby repeating said start time setting step to set said start time being later than said reference time.

6. The debug program in said ROM cartridge, according to claim 5, further comprising:

means for calculating day of the week of said start time based on said reference time.

* * * * *